(12) United States Patent
Carpenter et al.

(10) Patent No.: US 9,471,223 B2
(45) Date of Patent: Oct. 18, 2016

(54) VOLUME CLASS MANAGEMENT

(71) Applicant: International Business Machines Corporation, Armonk, NY (US)

(72) Inventors: Preston A. Carpenter, Vail, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 195 days.

(21) Appl. No.: 14/296,582

(22) Filed: Jun. 5, 2014

(65) Prior Publication Data

US 2015/0355840 A1 Dec. 10, 2015

(51) Int. Cl.
*G06F 12/02* (2006.01)
*G06F 3/06* (2006.01)

(52) U.S. Cl.
CPC .......... *G06F 3/0604* (2013.01); *G06F 3/0631* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 7,043,619 B1* | 5/2006 | Knight | G06F 3/0605 709/220 |
| 7,266,719 B1 | 9/2007 | LeCrone et al. | |
| 8,271,612 B2 | 9/2012 | Acedo et al. | |
| 2006/0161753 A1* | 7/2006 | Aschoff | G06F 3/0613 711/170 |
| 2011/0283077 A1* | 11/2011 | Cammarata | G06F 3/0619 711/170 |
| 2013/0019071 A1* | 1/2013 | Lewis | G06F 3/0607 711/154 |

* cited by examiner

*Primary Examiner* — Gary Portka
(74) *Attorney, Agent, or Firm* — Nelson and Nelson; Daniel P. Nelson; Alexis V. Nelson (57) ABSTRACT

A method for setting up and managing large numbers of storage volumes is disclosed. In one embodiment, such a method enables a user to establish a volume class comprising various volume attributes. The method further enables the user to assign a volume or range of volumes to the volume class. Once the volume or range of volumes is assigned to the volume class, the method automatically sets up, without user invention, the volumes with the attributes designated for the volume class. When a new volume is assigned to the volume class, the method automatically sets up the new volume with the attributes of the volume class, including automatically calculating a VTOC size for the new volume based on VTOC sizes for volumes already assigned to the volume class. A corresponding apparatus and computer program product are also disclosed.

18 Claims, 6 Drawing Sheets

VOLUME CLASS MANAGEMENT

BACKGROUND

1. Field of the Invention

This invention relates to apparatus and methods for setting up and managing large numbers of storage volumes.

2. Background of the Invention

Currently, in operating systems such as Multiple Virtual Storage (MVS) and z/OS, a user needs to perform various actions to get a volume online. One of the most important tasks when initializing a volume is to properly establish and set up a Volume Table of Contents, or VTOC. The VTOC is a data structure that enables data sets to be located in a particular volume. The VTOC typically resides in the first 64K tracks on the volume, and lists the name, size, location, and permissions of each data set on the volume. The VTOC keeps track of which extents in the volume are allocated to particular data sets and which extents in the volume are free.

To locate a data set, an application may initially look in a data structure called a "catalog" to determine the volume in which the data set resides. Once the correct volume is determined, the application may look in the volume's VTOC to determine exactly where in the volume the data set resides. A data set may reside in contiguous extents or be spread out over non-contiguous extents in the volume.

In addition to the setting up the VTOC, other attributes of the volume may need to be determined before bringing a volume online. For example, a volume name (e.g., volume serial number) may be selected for a volume prior to bringing it online. Other issues such as whether data sets in the volume will be storage management subsystem (SMS) managed and, if so, what SMS-managed storage groups the volume need to belong to, may need to be addressed before volumes are brought online. Ensuring that volumes are properly set up can consume a considerable amount of time and energy, particularly when dealing with hundreds or even thousands of new volumes.

In view of the foregoing, what are needed are apparatus and methods to more effectively manage and set up large numbers of storage volumes.

SUMMARY

The invention has been developed in response to the present state of the art and, in particular, in response to the problems and needs in the art that have not yet been fully solved by currently available apparatus and methods. Accordingly, apparatus and methods are disclosed to facilitate setting up and managing large numbers of storage volumes. The features and advantages of the invention will become more fully apparent from the following description and appended claims, or may be learned by practice of the invention as set forth hereinafter.

Consistent with the foregoing, a method for setting up and managing large numbers of storage volumes is disclosed. In one embodiment, such a method enables a user to establish a volume class comprising various volume attributes. The method further enables the user to assign a volume or range of volumes to the volume class. Once the volume or range of volumes is assigned to the volume class, the method automatically sets up, without user invention, the volumes with the attributes designated for the volume class. When a new volume is assigned to the volume class, the method may automatically set up the new volume with the attributes of the volume class, including automatically calculating a VTOC size for the new volume based on VTOC sizes for volumes already assigned to the volume class.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
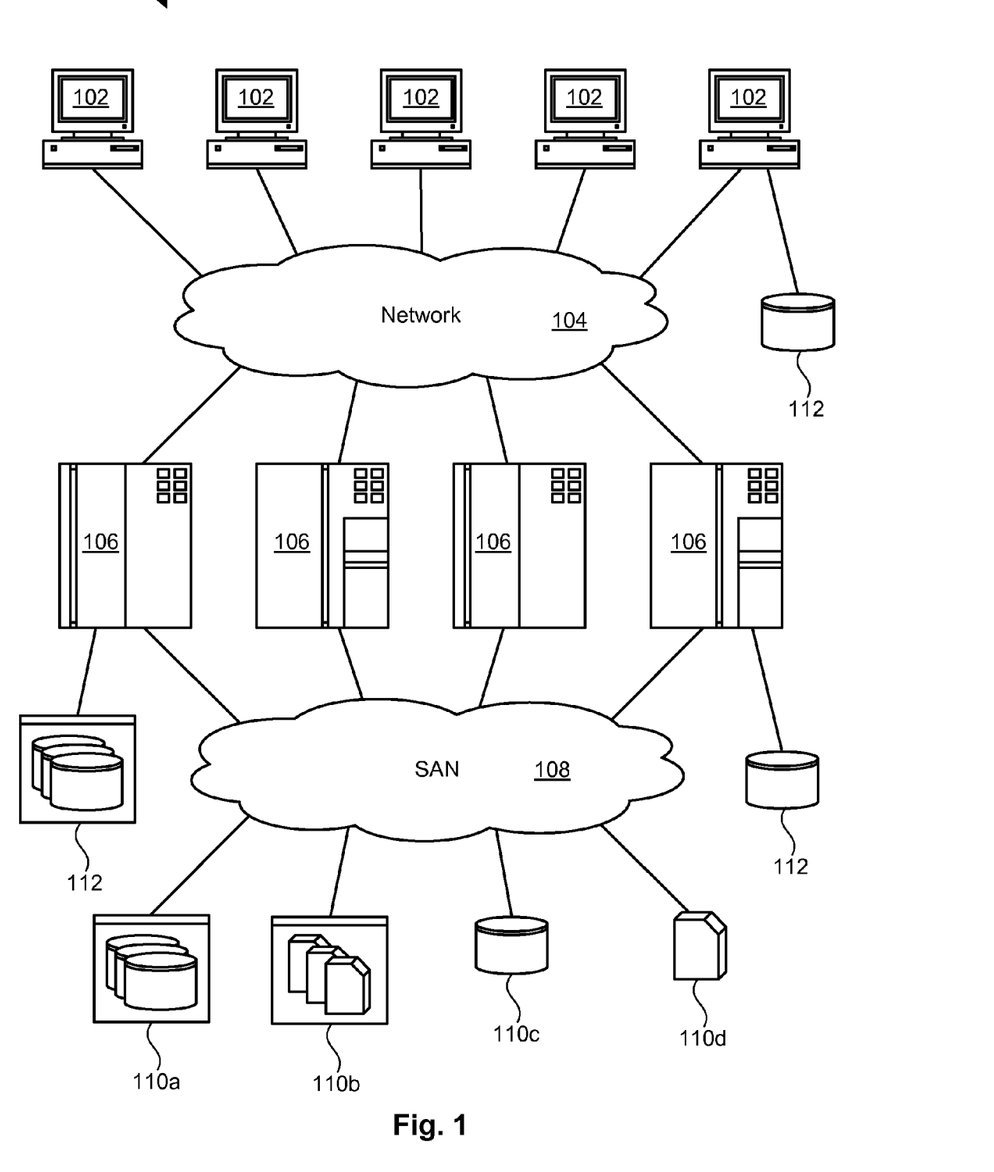
FIG. 1 is a high-level block diagram showing one example of a network architecture in which an apparatus and method in accordance with the invention may be implemented.

Referring to FIG. 1, one example of a storage network architecture 100 is illustrated. The storage network architecture 100 is presented to show one example of an environment where an apparatus and method in accordance with the invention may be implemented. The storage network architecture 100 is presented only by way of example and not limitation. Indeed, the apparatus and methods disclosed herein may be applicable to a wide variety of network architectures, in addition to the storage network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
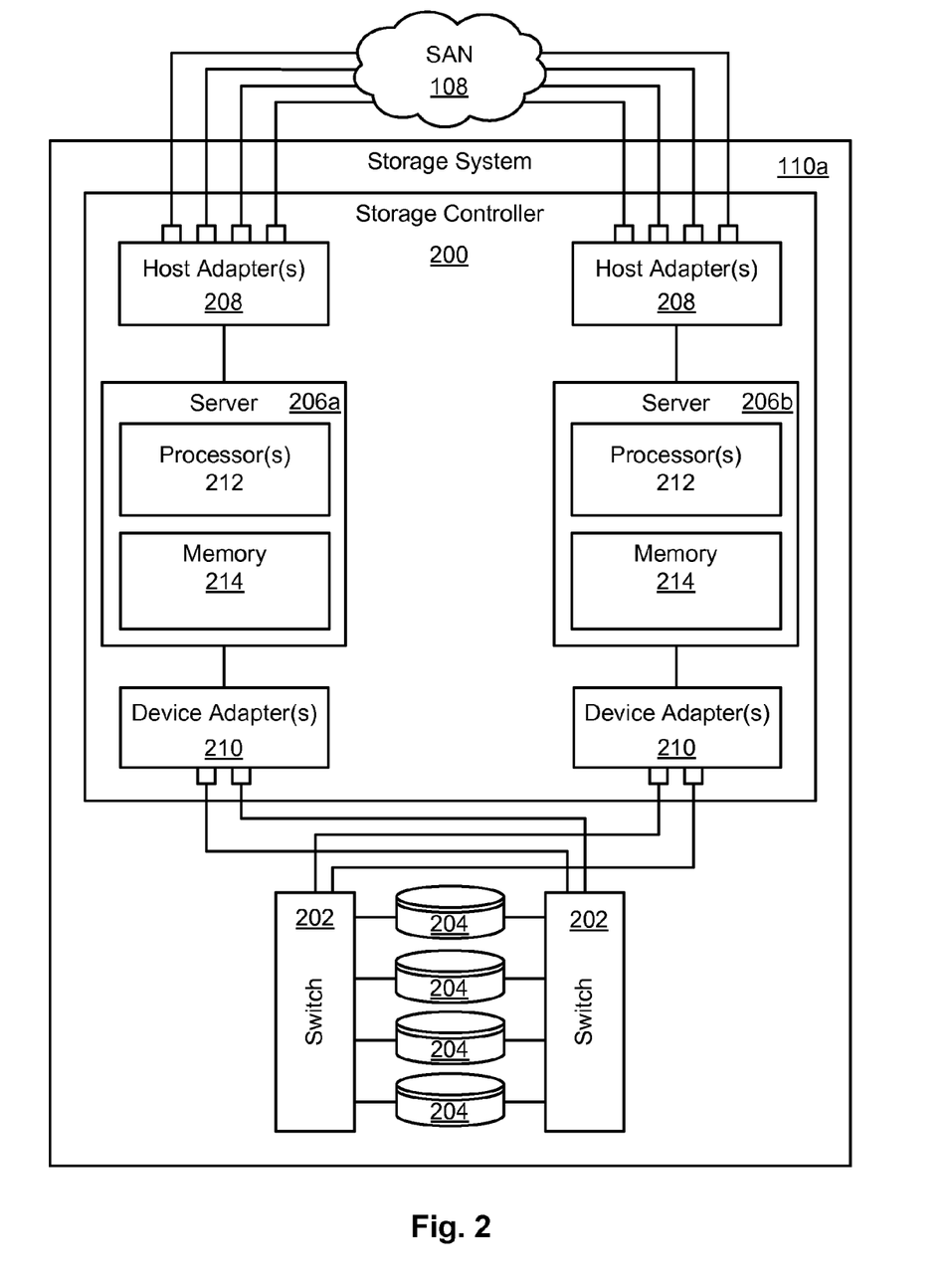
FIG. 2 is a high-level block diagram showing one example of a storage system hosting one or more physical volumes.

Referring to FIG. 2, one embodiment of a storage system 110a containing an array of hard-disk drives 204 and/or solid-state drives 204 is illustrated. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106 running operating systems such as MVS, z/OS, or the like) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110a, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

Figure 3:
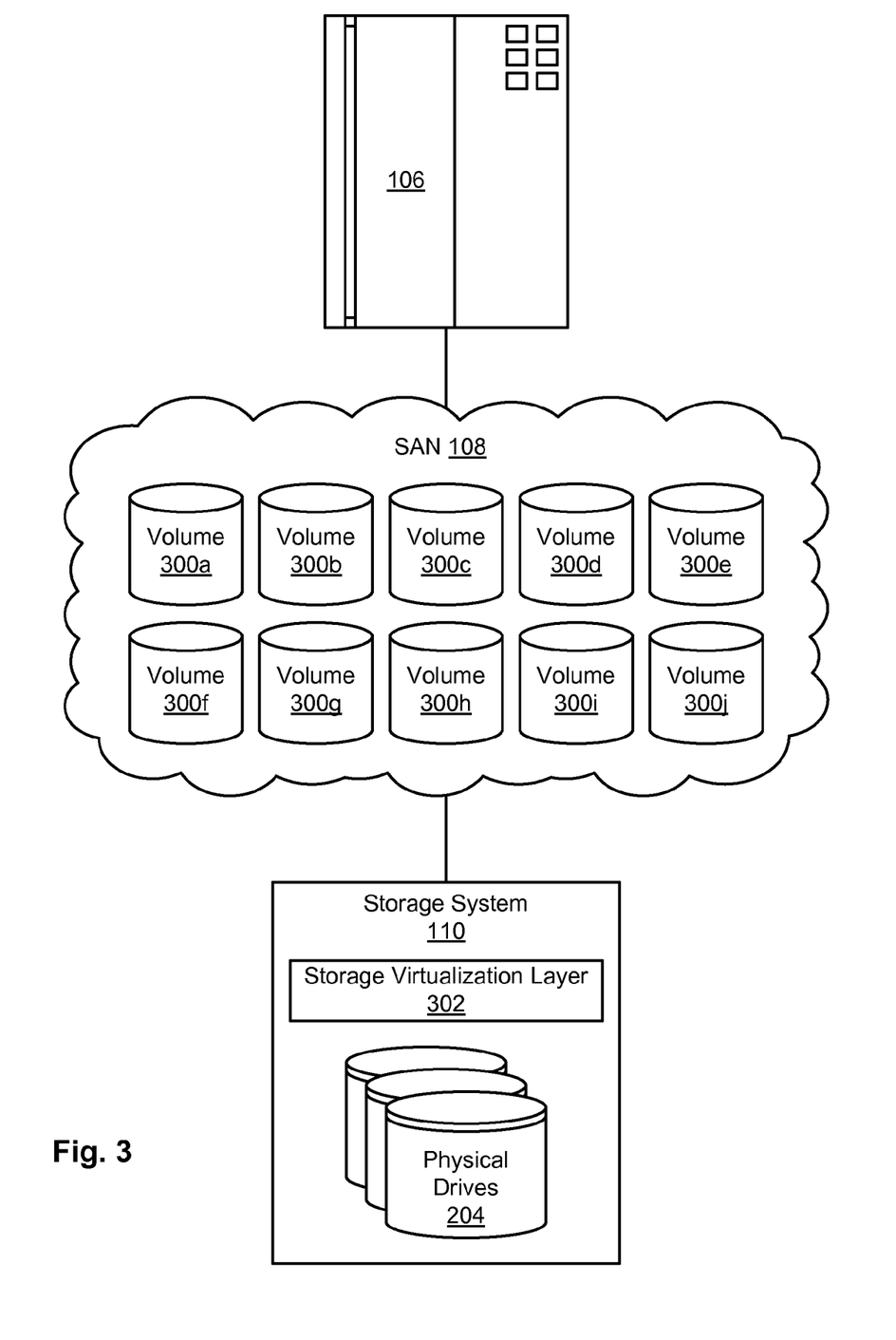
FIG. 3 is a high-level block diagram showing logical volumes exposed by a storage system.

Referring to FIG. 3, in certain embodiments, a storage system 110 such as that illustrated in FIG. 2 may be configured to present or expose one or more volumes 300a-j to a host system 106. The volumes 300 may be logical volumes 300, meaning that the volumes 300 may appear to be physical drives 204 (e.g., hard drives, solid state drives, etc.) to a host system 106 but do not necessarily directly correlate to physical drives 204 on the storage system 110. For example, in certain embodiments, a physical drive 204 may be used by more than one volume 300 or a volume 300 may span all or part of multiple physical drives 204. A storage virtualization layer 302 within the storage system 110 or other appliance may expose the volumes 300 and handle the mapping between the volumes 300 and the physical drives 204.

As previously mentioned, in host systems 106 using operating systems such as Multiple Virtual Storage (MVS) or z/OS, a user typically needs to perform several tasks to get a volume 300 online. This may include, for example, setting up a VTOC to keep track of data sets on the volume 300. Setting up a VTOC may require determining a size for the VTOC and a location for the VTOC on the volume 300. A user may also need to establish a volume name (e.g., volume serial number) and determine whether data sets in the volume 300 will be SMS-managed. If the data sets are to be SMS-managed, the user may need to determine which SMS-managed storage groups the volumes 300 need to belong. Making these determinations and setting up the volumes 300 can consume a considerable amount of time and energy, particularly when a user is trying to bring hundreds or even thousands of volumes 300 online.

Figure 4:
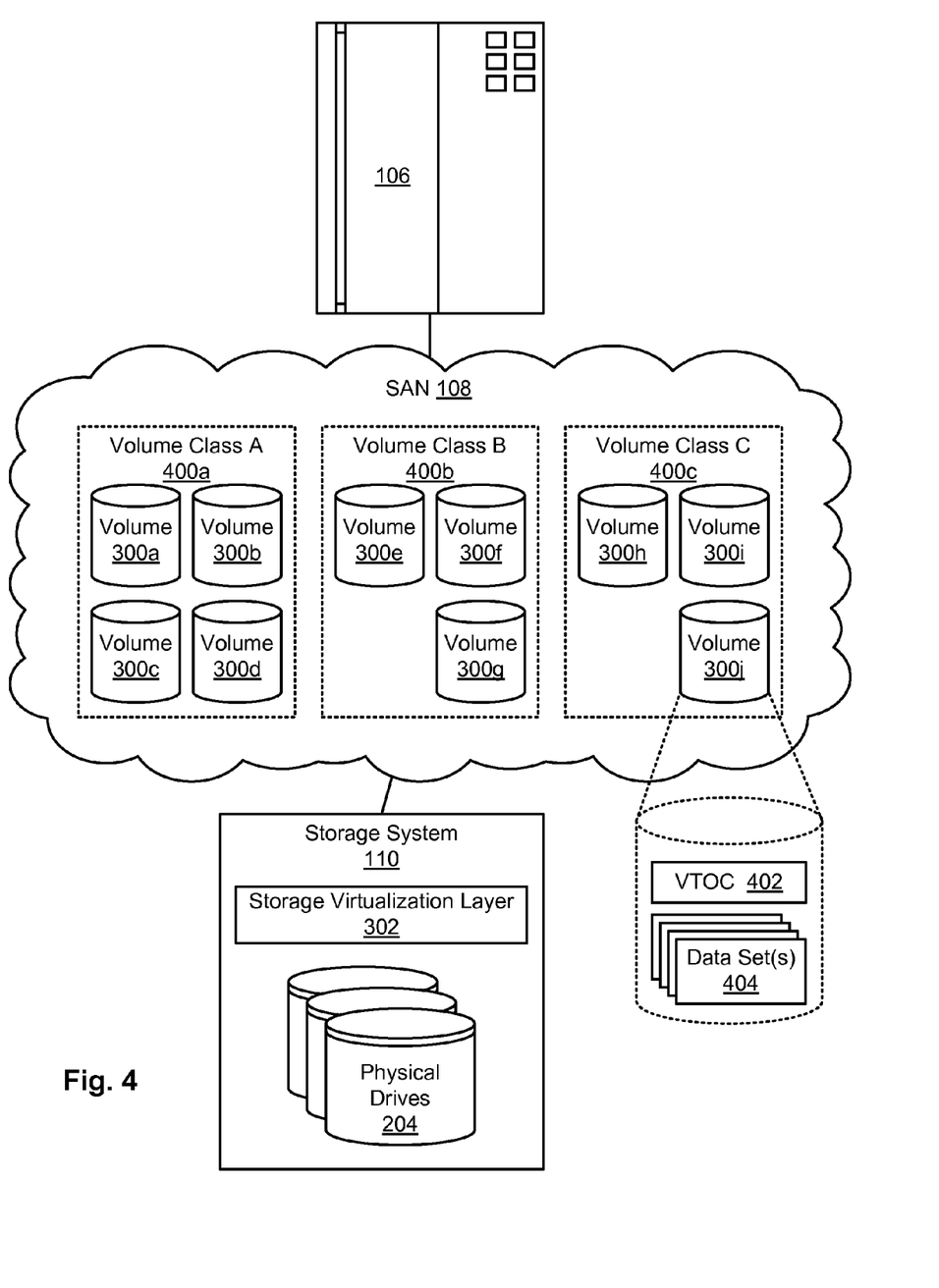
FIG. 4 is a high-level block diagram showing volume classes to which the logical volumes may be assigned.

Referring to FIG. 4, in order to more efficiently manage large numbers of volumes 300 in operating systems such as MVS or z/OS, various volume classes 400 may be established. These volume classes 400 may have user-defined volume attributes associated therewith. For example, a volume class 400 may have attributes with respect to VTOC size, VTOC location, volume names or serial numbers, whether volumes 300 in the volume class 400 will be SMS-managed, and, if SMS-managed, what storage groups volumes 300 need to belong to. When a volume 300 or group of the volumes 300 is assigned to a volume class 400 (such as by assigning a volume number, range of volume numbers, or other volume identifiers to the volume class 400), the volume 300 or group of the volumes 300 may be automatically configured with the attributes associated with the volume class 400. Once assigned to a volume class 400, volumes 300 may be automatically managed in accordance with the volume class 400 from that point forward.

As shown in FIG. 4, the volumes 300a-j described in FIG. 3 have been assigned to one of three volume classes 400a-c, in this example Volume Classes A, B, and C. Each of these volume classes 400 may have a different set of volume attributes associated therewith. Upon assigning the volumes 300a-j to the volume classes 400a-c, the volumes 300a-j may be automatically configured with the volume attributes of the associated volume class 400. The illustrated embodiment is very simple with a small number of volumes 300 and volume classes 400. Real-world implementations would likely include a much larger number of volumes 300 and volume classes 400.

As previously discussed, one of the most important tasks when initializing a volume 300 is to properly establish and set up a Volume Table of Contents 402, or VTOC 402, for the volume 300. The VTOC 402 is a data structure that enables data sets 404 to be located in a particular volume 300. The VTOC 402 typically resides in the first 64K tracks of the volume 300, and lists the name, size, location, and permissions of each data set 404 on the volume 300. The VTOC 402 keeps track of which extents in the volume 300 are allocated to particular data sets 404 as well as which extents are free.

To locate a data set 404 in a volume 300, an application may initially look in a data structure referred to as a "catalog" to determine the volume 300 in which the data set 404 resides. Once the correct volume 300 is determined, the application may look in the volume's VTOC 402 to determine exactly where in the volume 300 the data set 404 resides. A data set 404 may reside in contiguous extents or be spread out over non-contiguous extents in the volume 300. The VTOC 402 provides a mapping between data set 404 and extents in the volume 300.

One of the most important issues when setting up a VTOC 402 is to properly select the VTOC's size. The size of the VTOC 402 is directly related to a number of data sets 404 in the volume 300. A larger number of data sets 404 data sets 404 will require a larger VTOC 402, whereas a smaller number of data sets 404 will require a smaller VTOC 402. If a VTOC 402 is too small, a full condition may be encountered if too many data sets 404 are placed on the volume 300. Such a condition may in some cases require moving all data off of the volume 300, reformatting the volume 300 with a larger VTOC 402, and then moving the data back onto the volume 300. If a VTOC 402 is larger than what is needed to keep track of data sets 404 on the volume 300, the VTOC 402 may unnecessarily consume storage space on the volume 300, leading to inefficient storage utilization. Thus, in order to properly size a VTOC 402 for a volume 300, information is needed about the size and/or number of data sets 404 that are intended to be stored on the volume 300.

In certain embodiments in accordance with the invention, when a volume 300 is assigned to a volume class 400, an optimal VTOC 402 size for the volume 300 may be automatically calculated. A VTOC 402 with the calculated size may then be automatically created for the volume 300. In certain embodiments, an optimal size may include a buffer. For example, a buffer of ten or twenty percent may be added to the calculated VTOC size to prevent full conditions where the VTOC 402 runs out of space. This may prevent or reduce the chance of having to reformat the volume 300 with a larger VTOC 402, which can be a time-consuming and expensive process.

Various different algorithms may be used to determine an optimal VTOC size for a volume 300. For example, when volumes 300 are initially assigned to an empty volume class 400 (having no volumes 300 assigned thereto), a determination may be made with regard to the types and sizes (or average size) of data sets 404 the volumes 300 will hold. This may be determined, for example, by determining an application that is to access the volumes 300 and what types and sizes of data sets 404 are typically used by the application. In other embodiments, other similar volume classes 400 may be analyzed to determine the types and sizes of data sets 404 that volumes 300 in the volume classes 400 contain. Using this information, the types and sizes of data sets 404 may be predicted for volumes 300 that are assigned to the volume class 400 and VTOC sizes may be calculated accordingly.

Figure 5:
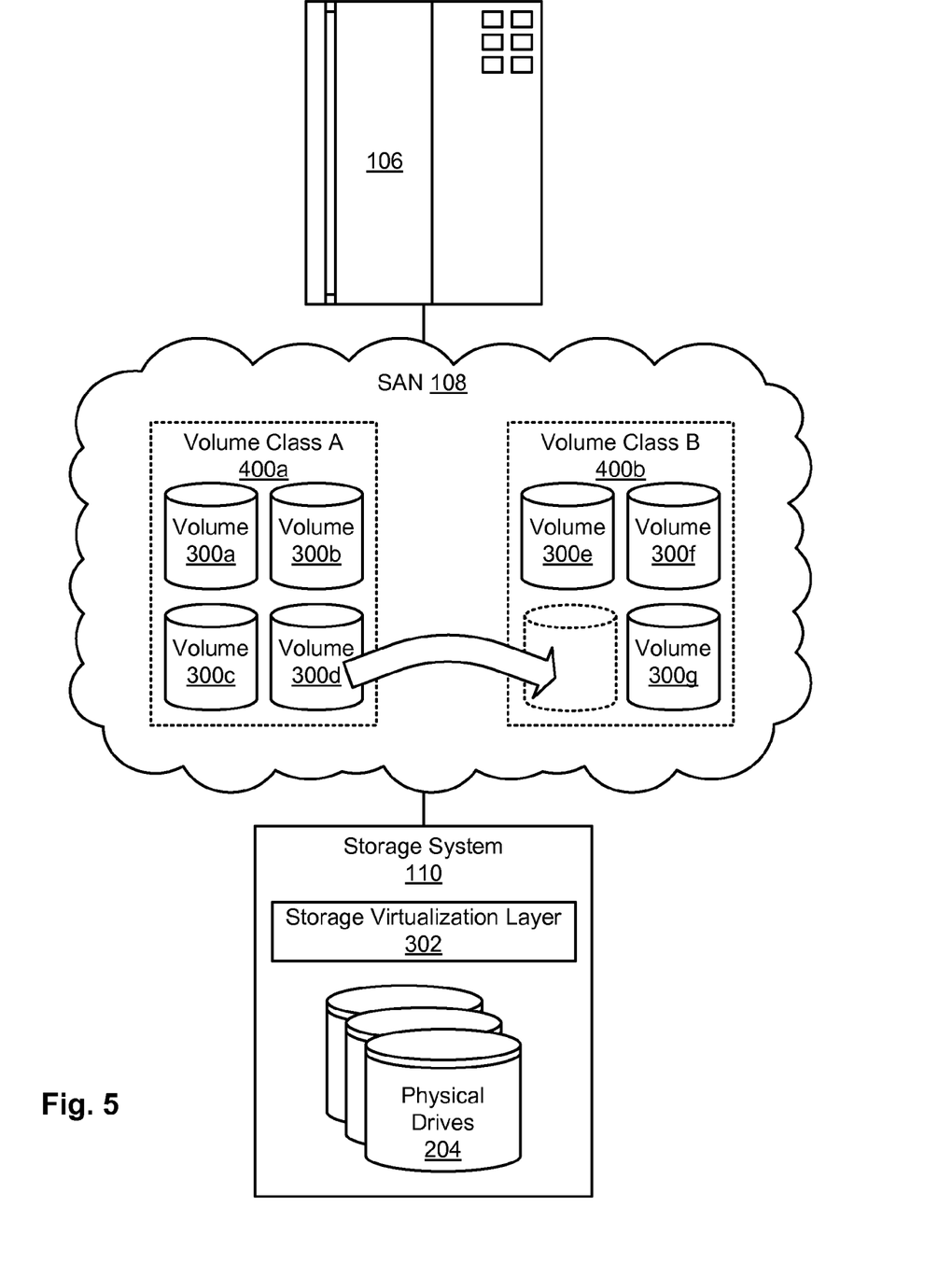
FIG. 5 is a high-level block diagram showing assignment of a new logical volume to a volume class.

In certain embodiments, when a volume 300 is added to a non-empty volume class 400 (i.e., a volume class 400 that has at least one volume 300 assigned thereto), as shown in FIG. 5 (where volume 300d is moved to volume class 400b), other volumes 300 already assigned to the volume class 400 may be analyzed. For example, the size of data sets 404 in the other volumes 300 may be analyzed to determine an average size of data sets 404 in the volumes 300. Because volumes 300 in a volume class 400 may be used by the same application, or in the same manner, it may be assumed with some confidence that data sets 404 in the new volume 300 will be approximately the same size or the same average size as data sets 404 in the other volumes 300. Using this assumption, the size of the VTOC 402 for the new volume 300 may be calculated when it is assigned to the volume class 400.

When calculating an optimal VTOC 402 size for a volume 300, the size of the volume 300 (e.g., number of tracks, cylinders, etc.) may be taken into consideration. For example, if other volumes 300 assigned to the volume class 400 are larger or smaller than a new volume 300 added to the volume class 400, the size difference of the volumes 300 may be taken into consideration when determining the VTOC size. For example, if a new volume 300 is fifty percent smaller than an existing volume 300 already assigned to the volume class 400, and the new volume 300 will hold roughly the same size data sets 404 as the existing volume 300, the new volume 300 may hold a number of data sets 404 that is roughly fifty percent smaller than the number of data sets 404 in the existing volume 300. It follows that the VTOC 402 for the new volume 300 may be sized fifty percent smaller than the VTOC 402 of the existing volume 300, assuming that the VTOC 402 of the existing volume 300 was sized correctly for its number of data sets 404. If the VTOC 402 of the existing volume 300 was not sized correctly (e.g., the VTOC 402 is underutilized, for example), the size of the VTOC 402 for the new volume 300 may be adjusted accordingly.

Figure 6:
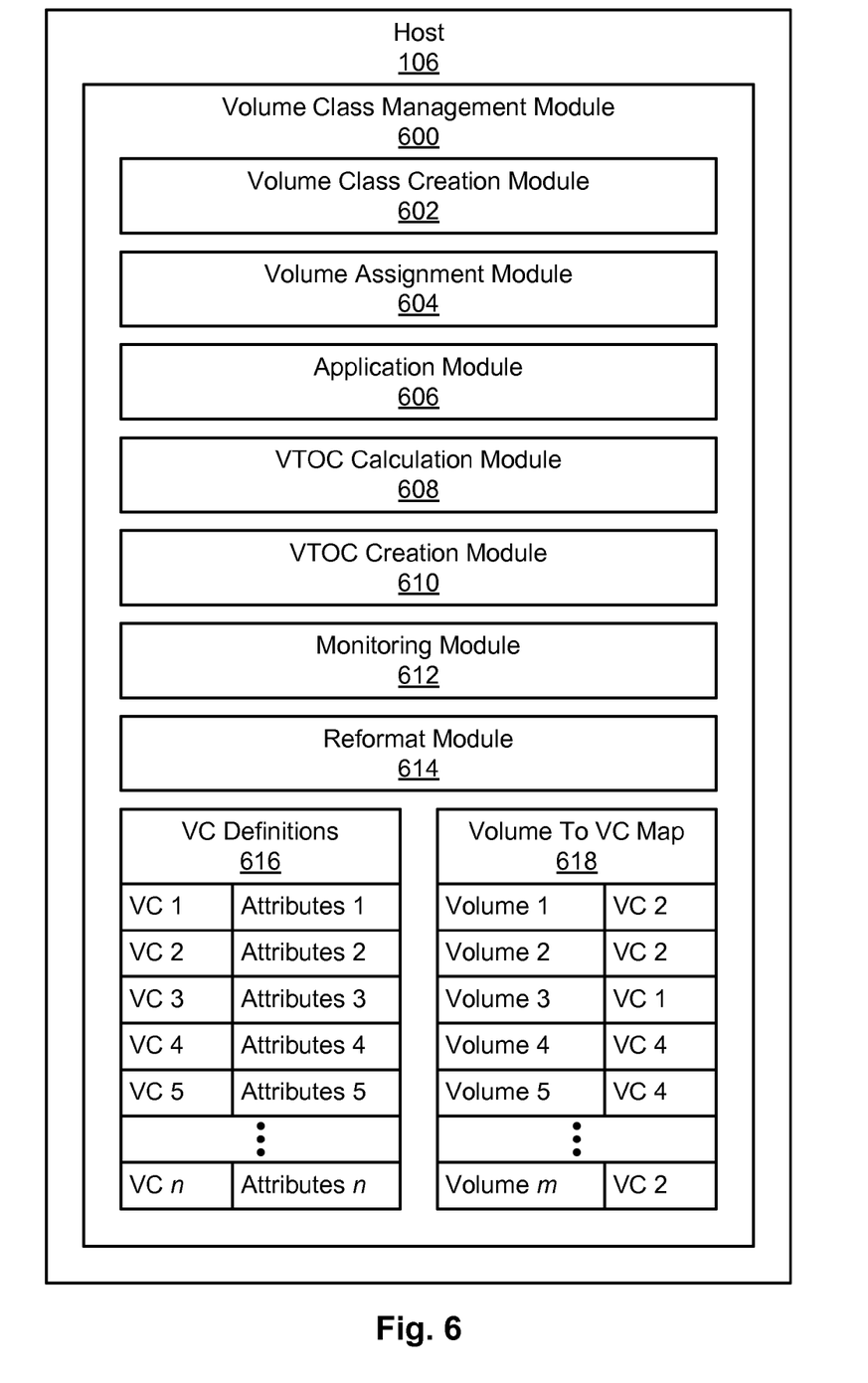
FIG. 6 is a high-level block diagram showing a volume class management module in accordance with the invention.

Referring to FIG. 6, one embodiment of a volume class management module 600 for setting up and managing large numbers of volumes 300 is illustrated. As shown, the volume class management module 600 includes one or more internal modules to provide various features and functions. These modules may be implemented in hardware, software or firmware executable on hardware, or a combination thereof. The modules are presented by way of example and not limitation. Indeed, alternative embodiments may include additional or fewer modules than those illustrated, or the modules may be organized differently. Furthermore, in some embodiments, the functionality of some modules may be broken into multiple modules or, conversely, the functionality of several modules may be combined into a single or fewer modules. Although all the modules in FIG. 6 are illustrated within a host system 106, it should be recognized that functionality associated with the modules is not necessarily implemented within a host system 106 or entirely within a host system 106. In other embodiments, some or all of the functionality may be implemented in other devices (storage systems 110, other host systems 106 or devices) or potentially distributed across multiple devices. Thus, the location of the modules is not necessarily limited to the illustrated host system 106.

As shown, in certain embodiments, a volume class management module 600 in accordance with the invention includes one or more of a volume class creation module 602, volume assignment module 604, application module 606, VTOC calculation module 608, VTOC creation module 610, monitoring module 612, and reformat module 614. The volume class management module 600 may also include volume class definitions 616 and a volume-to-volume-class map 618 to provide a bookkeeping function for the volume class management module 600.

A volume class creation module 602 enables a user to establish volume classes 400, including attributes for the volume classes 400. Attributes may include attributes such as VTOC size, VTOC location, volume names or serial numbers, whether volumes 300 in the volume class 400 will be SMS-managed, what storage groups volumes 300 need to belong to if SMS-managed, and the like. Other attributes are also possible and within the scope of the invention. In certain embodiments, volume class definitions 616 may be established to define which attributes are associated with which volume classes 400.

Once a volume class 400 is established, a volume assignment module 604 may enable volumes 300 to be assigned to the volume class 400. This may be accomplished by assigning volumes 300 individually or in groups or ranges. In certain embodiments, assigning a volume 300 or volumes 300 to a volume class 400 may be accomplished by mapping a device number (i.e., an identifier associated with a volume 300) or a range of device numbers to the volume class 400. In certain embodiments, a volume-to-volume-class map 618 may be used to track which volumes 300 or ranges of volumes 300 are mapped to which volume classes 400.

Once volumes 300 are mapped to volume classes 400, an application module 606 may apply the attributes associated with the volume class 400 to the volumes 300. In certain embodiments, this may include applying VTOC 402 attributes to the volume 300. As further explained below, a VTOC calculation module 608 may calculate an optimal VTOC size for the volume 300 and a VTOC creation module 610 may create the VTOC 402 in accordance with the calculated size. The application module 606 may store the VTOC 402 on the volume 300 at a location specified in the attributes of the volume class 400. If the attributes of a volume class 400 indicate that volumes 300 are to be SMS-managed, the application module 606 may assign the volume 300 to an SMS-managed storage group designated in the attributes. The application module 606 may apply any other attributes to the volumes 300 of a volume class 400 as needed.

As indicated above, a VTOC calculation module 608 may calculate an optimal size for the VTOC 402. Various different algorithms may be used to determine the optimal size. In certain cases, the VTOC calculation module 608 may apply recommended settings with regard to the size of a VTOC 402 based on the size of the volume 300. In other embodiments, if a volume class 400 is empty, the VTOC calculation module 608 may determine what type and size of data sets 404 the volume 300 will likely hold. This may be accomplished, for example, by determining what application will access the volumes 300 and what types and sizes of data sets 404 are typically used by the application. This may also be accomplished by looking at other volumes 300 or volume classes 400 with similar data sets 404 and determining what types and sizes of data sets 404 the volumes 300 contain. Using this information, assuming it is statistically significant enough to be relied upon, the type and size of data sets 404 may be predicted for the volume 300 and the VTOC 402 size may be calculated accordingly.

If a volume 300 is being added to a non-empty volume class 400 (i.e., a volume class 400 that has at least one volume 300 assigned thereto), the VTOC calculation module 608 may analyze volumes 300 already assigned to the volume class 400. For example, the VTOC calculation module 608 may analyze the size of data sets 404 for volumes 300 in the volume class 400 and determine an average size of the data sets 404. Because volumes 300 in a volume class 400 may be used by the same application, or in the same manner, the VTOC calculation module 608 may assume that data sets 404 in the new volume 300 will be approximately the same size or the same average size as data sets 404 in other volumes 300 associated with the volume class 400. Using this assumption, the VTOC calculation module 608 may calculate an optimal size for the VTOC 402 of the new volume 300.

When calculating an optimal VTOC size, the VTOC calculation module 608 may consider the size of a volume 300 (e.g., number of tracks, cylinders, etc.) compared to other volumes 300 and adjust the size of the VTOC 402 accordingly. The VTOC calculation module 608 may also consider the VTOC utilization of existing volumes 300 when calculating VTOC size. For example, if VTOCs 402 of similar volumes 300 with similar data sets 404 are underutilized, the VTOC calculation module 608 may take this into account when determining the VTOC size for a new volume 300. In certain embodiments, the VTOC calculation module 608 is configured to incorporate a buffer into the size of the VTOC 402 to reduce or prevent situations where the VTOC 402 runs out of space. Once an optimal size is determined, the VTOC creation module 610 may create the VTOC 402 on the volume 300.

A monitoring module 612 may monitor for conditions that may require attributes of a volume 300 to be changed. For example, if a volume 300 is moved from a first volume class 400 to a second volume class 400 (e.g., by changing the mapping of the volume 300 in the volume-to-volume-class map 618), the monitoring module 612 may detect this move and invoke necessary modules to bring the volume 300 into conformance with the second volume class 400 (e.g., by applying attributes of the second volume class 400 to the volume 300). If attributes of a volume class 400 are changed, the monitoring module 612 may detect these changes and invoke necessary modules to change the attributes of the volumes 300 that are assigned to the volume class 400. The monitoring module 612 may also monitor for conditions such as a full VTOC 402 on a volume 300. If such a condition is encountered, the monitoring module 612 may invoke (or enable a user to invoke) a reformat module 614 to reformat the volume 300. In certain embodiments, the reformat module 614 moves data off of a volume 300, generates a new larger VTOC 402 on the volume 300, and moves data back onto the volume 300.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for setting up and managing large numbers of storage volumes, the method comprising:
   establishing, by a user, a volume class having an algorithm for calculating an optimal volume table contents (VTOC) size associated therewith; and
   assigning, by the user, a plurality of volumes to the volume class, wherein assigning the plurality of volumes to the volume class causes the following to automatically occur for each of the plurality of volumes:
   calculate a VTOC size using the algorithm associated with the volume class; and
   set up the volume with a VTOC having the calculated VTOC size.

2. The method of claim 1, further comprising assigning, by the user, a new volume to the volume class.

3. The method of claim 2, where assigning the new volume comprises calculating a VTOC size for the new volume based on VTOC sizes for volumes already assigned to the volume class.

4. The method of claim 3, wherein calculating the VTOC size for the new volume comprises calculating the VTOC size for the new volume based on an average VTOC size for volumes already assigned to the volume class.

5. The method of claim 3, wherein calculating the VTOC size for the new volume comprises determining how many datasets the new volume is expected to hold.

6. The method of claim 3, wherein calculating the VTOC size for the new volume comprises determining the size of datasets the new volume is expected to hold.

7. The method of claim 3, wherein calculating the VTOC size for the new volume comprises building a buffer into the VTOC size.

8. A computer program product for setting up and managing large numbers of storage volumes, the computer program product comprising a non-transitory computer-readable storage medium having computer-usable program code embodied therein, the computer-usable program code comprising:
  computer-usable program code to enable a user to establish a volume class having an algorithm for calculating an optimal volume table contents (VTOC) size associated therewith; and
  computer-usable program code to enable the user to assign a plurality of volumes to the volume class, wherein assigning the plurality of volumes to the volume class causes the following to automatically occur for each of the plurality of volumes:
    calculate a VTOC size using the algorithm associated with the volume class; and
    set up the volume with a VTOC having the calculated VTOC size.

9. The computer program product of claim 8, further comprising computer-usable program code to enable a user to assign a new volume to the volume class.

10. The computer program product of claim 9, where assigning the new volume comprises calculating a VTOC size for the new volume based on VTOC sizes for volumes already assigned to the volume class.

11. The computer program product of claim 10, wherein calculating the VTOC size for the new volume comprises calculating the VTOC size for the new volume based on an average VTOC size for volumes already assigned to the volume class.

12. The computer program product of claim 10, wherein calculating the VTOC size for the new volume comprises determining how many datasets the new volume is expected to hold.

13. The computer program product of claim 10, wherein calculating the VTOC size for the new volume comprises determining the size of datasets the new volume is expected to hold.

14. The computer program product of claim 10, wherein calculating the VTOC size for the new volume comprises building a buffer into the VTOC size.

15. An apparatus for setting up and managing large numbers of storage volumes, the apparatus comprising:
  at least one processor;
  at least one memory device coupled to the at least one processor and storing instructions for execution on the at least one processor, the instructions causing the at least one processor to:
    enable a user to establish a volume class comprising a plurality of volume attributes;
    enable the user to assign a plurality of volumes to the volume class;
    automatically set up the plurality of volumes with the attributes of the volume class;
    assign a new volume to the volume class; and
    automatically calculate a VTOC size for the new volume based on VTOC sizes for volumes already assigned to the volume class.

16. The apparatus of claim 15, wherein automatically setting up comprises calculating a volume table of contents (VTOC) size for each volume in the volume class.

17. The apparatus of claim 15, wherein automatically calculating the VTOC size comprises calculating the VTOC size based on an average VTOC size for volumes already assigned to the volume class.

18. The apparatus of claim 15, wherein automatically calculating the VTOC size comprises determining at least one of how many datasets the new volume is expected to hold and the size of datasets the new volume is expected to hold.

* * * * *